United States Patent
Yamanaka

(10) Patent No.: US 7,094,825 B2
(45) Date of Patent: Aug. 22, 2006

(54) HYDROGENATED NITRILE RUBBER COMPOSITION

(75) Inventor: Takuya Yamanaka, Tsukuba (JP)

(73) Assignee: NOK Corporation, Tokyo (JP)

(*) Notice: Subject to any disclaimer, the term of this patent is extended or adjusted under 35 U.S.C. 154(b) by 0 days.

(21) Appl. No.: 10/524,628

(22) PCT Filed: Dec. 19, 2003

(86) PCT No.: PCT/JP03/16328

§ 371 (c)(1),
(2), (4) Date: Feb. 11, 2005

(87) PCT Pub. No.: WO2004/065479

PCT Pub. Date: Aug. 5, 2004

(65) Prior Publication Data

US 2005/0245666 A1    Nov. 3, 2005

(30) Foreign Application Priority Data

Jan. 17, 2003    (JP) .............................. 2003-009221

(51) Int. Cl.
*B60C 1/00*    (2006.01)
(52) U.S. Cl. ...................... 524/495; 524/565; 524/566; 524/424

(58) Field of Classification Search ................. 524/495, 524/565, 566, 424
See application file for complete search history.

(56) References Cited

U.S. PATENT DOCUMENTS 4,978,409 A * 12/1990 Fujiwara et al. ............ 156/315
5,013,783 A     5/1991 Thormer et al.

FOREIGN PATENT DOCUMENTS

| JP | 5-271479 | 10/1993 |
|----|----------|---------|
| JP | 2002 80639 | 3/2002 |
| JP | 2002-80639 | * 3/2002 |

* cited by examiner

*Primary Examiner*—Ling-Sui Choi
(74) *Attorney, Agent, or Firm*—Butzel Long

(57) ABSTRACT

A hydrogenated nitrile rubber composition, which comprises 100 parts by weight of hydrogenated nitrile rubber with a bound acrylonitrile content of not less than 30%, a polymer Mooney viscosity $ML_{1+4}(100°\text{ C.})$(according to JIS K6395) of not more than 80 (median value) and an iodine number of not more than 28 (median value), and 65 to 200 parts by weight of carbon fibers is provided as a hydrogenated nitrile rubber composition containing carbon fibers as filled at a high density, which can overcome inconveniences as to kneadability and moldability and improve the wear resistance, and thus can be used as a suitable molding material for sealing members.

9 Claims, No Drawings

HYDROGENATED NITRILE RUBBER COMPOSITION

TECHNICAL FIELD

The present invention relates to a hydrogenated nitrile rubber composition, and more particularly to a hydrogenated nitrile rubber composition suitable for use as a molding material for sealing members.

BACKGROUND ART

With recent higher performance of various industrial machinery and equipment, high temperatures, high pressure and high speeds are now conditions of sealing members use in the sliding parts of machinery. Thus, higher durability (heat resistance, pressure resistance and service longevity) is an important requirement for the sealing members. To attain the sealing performance of sealing members for a long time, it is necessary to improve the wear resistance. Fluids to be sealed include, for example, liquids such as engine oil, gear oil, transmission oil, long-life coolant, water, etc., and gases such as flon, carbon dioxide, nitrogen, hydrogen, natural gas, etc.

To improve the wear resistance, it has been proposed to mix the hydrogenated nitrile rubber with various fillers such as carbon black, silica, carbon fibers, etc., but no satisfactory and effective improvement of the wear resistance has been attained yet in many cases, though depending on use conditions of sealing members.

JP-A-2002-80639 proposes a hydrogenated nitrile rubber composition for use as a suitable molding material for sliding or high pressure sealing members with improved heat resistance, pressure deformation resistance, wear resistance, thermal conductivity, etc. The proposed hydrogenated nitrile rubber composition comprises 100 parts by weight of hydrogenated nitrile rubber having a bound AN content of not more than 38%, a hydrogenation degree of not less than 90% and an iodine number (median value) of not more than 28, and at least about 120 parts by weight of sum total of carbon black and other fillers, where the fillers comprises, for example, about 30 to about 100 parts by weight of carbon black, 10 to 60 parts by weight of graphite and about 5 to about 60 parts by weight of carbon fibers.

Indeed, high density filling of carbon fibers is effective for the improvement of wear resistance, but such problems as more frequent occurrences of bagging at the time of kneading with the hydrogenated nitrile rubber and other additives, poor flow in mold at the molding, etc. arise and actually molding cannot be carried out in many cases.

DISCLOSURE OF THE INVENTION

An object of the present invention is to provide a hydrogenated nitrile rubber composition containing carbon fibers as filled at a high density with an improved wear resistance, freed from inconveniences as to kneadability and moldability, and thus suitable for use as a molding material for sealing members.

The object of the present invention can be attained by a hydrogenated nitrile rubber composition, which comprises 100 parts by weight of hydrogenated nitrile rubber having a bound acrylonitrile content of not less than 30%, a polymer Mooney viscosity $ML_{1+4}(100°C.)$ (according to JIS K6395) of not more than 80 (median value) and an iodine number of not more than 28 (median value), and 65 to 200 parts by weight of carbon fibers.

High pressure sealing materials with a high wear resistance suitable for sealing a fluid under severe conditions such as high temperatures, high pressure, high speeds, etc. must maintain the mechanical and physical properties at their proper levels even at elevated temperatures due to heat generation by sliding, etc. Hydrogenated nitrile rubber is used from such a viewpoint. Hydrogenated nitrile rubber having a bound acrylonitrile (AN) content of not less than 30%, preferably 30 to 50%, a Mooney viscosity (median value) of not more than 80, preferably 70 to 50 and an iodine number (median value) of not more than 28, preferably not more than 10, is used in the present invention. The term "median value" herein used is defined as the middle value in a plurality of measurement values, and in the Examples and Comparative Examples mentioned below these median values are given for the Mooney viscosity and iodine number of hydrogenated NBR used therein.

Below a bound acrylonitrile content of 30%, the gas permeability will be considerably increased, and particularly the function as a carbon dioxide barrier material will be lost. Above an iodine number of 28, the heat resistance will be deteriorated. Hydrogenated nitrile rubber having a Mooney viscosity of more than 80, for example, that with a Mooney viscosity of 85 used in Examples of the afore-mentioned JP-A-2002-80639, is difficult to knead together with a large amount of carbon fibers, resulting in difficult molding. Even if kneading is possible to conduct, the flow becomes poor at the time of molding, resulting in failure to mold desired products.

The hydrogenated nitrile rubber with such properties is mixed with 65 to 200 parts by weight, preferably 65 to 150 parts by weight, of carbon fibers, on the basis of 100 parts by weight of the hydrogenated nitrile rubber. Below 65 parts by weight, no sealing members with a sufficient wear resistance will be obtained, whereas above 200 parts by weight the kneadability and moldability will be deteriorated. Carbon fibers for use in the present invention include for example, PAN process carbon fibers, pitch-based carbon fibers, rayon-based carbon fibers, etc. Carbon fibers with fiber diameters of about 1 to about 20 μm, preferably about 5 to about 15 μm and fiber lengths of about 0.03 to about 1 mm, preferably about 50 to about 500 μm, are used in the present invention.

To further improve the wear resistance, not more than about 100 parts by weight, preferably about 30 to about 100 parts by weight, of carbon blacks such as SRF, GPF, FEF, HAF, IISAF, ISAF, SAF, etc. or not more than about 60 parts by weight, preferably about 5 to about 60 parts by weight of graphite, besides the carbon fibers, can be mixed with 100 parts by weight of the hydrogenated nitrile rubber. Simultaneous use of carbon fibers and graphite can be further improve the wear resistance. Sum total of fillers including carbon fibers is about 90 to about 250 parts by weight, preferably about 120 to about 220 parts by weight, on the basis of 100 parts by weight of the hydrogenated nitrile rubber. When the sum total of the filler exceeds 250 parts by weight, the kneadability and the moldability will be deteriorated.

Other fillers for use in the present invention than those mentioned above include, for example, non-porous inorganic powders such as mica, talc, silica, clay, activated calcium carbonate, calcium silicate, etc., or polytetrafluoroethylene powder. In the case of using silica, it is preferable to use a silane coupling agent, etc. at the same time to improve the reinforcing ability. In the case of using polytetrafluoroethylene powder, further improvement of lubricating ability is expectable.

The hydrogenated nitrile rubber composition comprising the afore-mentioned components is subjected to peroxide cross-linking, usually using an organic peroxide. Organic peroxide for use for this purpose includes, for example, di-t-butyl peroxide, dicumyl peroxide, t-butyl cumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexine-3,1,3-di(benzoylperoxy)hexane, t-butylperoxybenzoate, t-butylperoxyisopro-pyl carbonate, n-butyl-4,4'-di(t-butylperoxy)valerate, etc. and is used in a proportion of about 1 to about 10 parts by weight, preferably about 2 to about 8 parts by weight, on the basis of 100 parts by weight of hydrogenated nitrile rubber.

In the case of using the organic peroxide, it is preferable to use a polyfunctional unsaturated compound as a cocross-linking agent at the same time. For example, triallyl (iso) cyanurate, trimethylolpropane tri-(meth)acrylate, triallyl trimellitate, butadiene oligomer or the like can be used in a proportion of about 1 to about 10 parts by weight, preferably about 2 to about 8 parts by weight, on the basis of 100 parts by weight of hydrogenated nitrile rubber.

The composition can further contain, if desired, various compounding ingredients usually used in the rubber industry, for example, a processing aid such as stearic acid, palmitic acid, paraffin wax, etc., an acid acceptor such as zinc oxide, magnesium oxide, hydrotalcite, etc., an antioxidant, a plasticizer, etc.

The composition can be prepared by kneading with a kneader such as Intermix, a kneader, a Banbury mixer, etc. or open rolls, etc. The cross-linking is carried out usually by heating at about 160° to about 220° C. for about 1 to about 10 minutes, using an injection molding machine, a compression molding machine, a vulcanization press, etc. and, if necessary, a heating treatment is further carried out by heating at about 180° C. or higher for about 1 to about 30 hours. Such a heat treatment is effective for further improvement of the heat resistance.

BEST MODES FOR CARRYING OUT THE INVENTION

The present invention will be described below, referring to Examples.

EXAMPLE 1

| | Parts by weight |
|---|---|
| Hydrogenated NBR (Zetpol 2000L, a product of Nippon Zeon Co., AN content: 36.2%, iodine number: 4, Mooney viscosity: 65) | 100 |
| SRF carbon black | 90 |
| Pitch-based carbon fibers (a product of Osaka Gas Chemical Co., fiber diameter: 10 μm, fiber length: 60 μm) | 65 |
| Graphite (AO, a product of Nichiden Carbon Co.) | 10 |
| Antioxidant (#445, a product of Uniroyal Co.) | 3 |
| Organic peroxide (Percumyl D, a product of NOF Corp.) | 5 |
| Polyfunctional unsaturated compound cocross-linking agent (B3000, a product of JSR) | 8 |

The foregoing components were kneaded together through 10-inch rolls and press cross-linked at 180° C. for 3 minutes to mold 0.2 mm-thick test pieces and also lip-formed seals (inner diameter: 10 mm) for revolution tests.

The test pieces and lip-formed seals were tested to determine the following properties:

Kneadability: Visual determination of frequency of bagging occurrence at the time of 10-inch roll kneading Moldability: Visual determination of flow in the mold at the time of molding lip-formed seals for shafts Wear evaluation: Lip-formed seals for shafts are subjected to a revolution test using engine oil as a sealing fluid under conditions of 9500 rpm, pressure of 5.5 MPa and fluid temperature of 130° C. for a test time of 3 hours to measure a wear depth at the lip part Sealability: Measurement of an amount of leaked oil at the time of the above-mentioned wear evaluation

EXAMPLE 2

In Example 1, the amount of carbon fibers was changed to 120 parts by weight.

EXAMPLE 3

In Example 1, the same amount of hydrogenated NBR (Zetpol 1000L, a product of Nippon Zeon Corp., AN content: 44.2%, iodine number: 7, Mooney viscosity: 70) was used.

EXAMPLE 4

In Example 2, the same amount of hydrogenated NBR (Zetpol 2000LL, a product of Nippon Zeon Corp., AN content: 36.2%, iodine number: 7, Mooney viscosity: 60) was used.

COMPARATIVE EXAMPLE 1

In Example 1, the amount of carbon fibers was changed to 45 parts by weight.

COMPARATIVE EXAMPLE 2

In Example 1, the same amount of hydrogenated NBR (Zetpol 2000, a product of Nippon Zeon Corp., AN content: 36.2%, iodine number: 4, Mooney viscosity: 85) was used.

Results obtained in the foregoing Examples 1 to 4 and Comparative Examples 1 to 2 are given in the following Table.

TABLE

| Determination. evaluation Items | Ex. 1 | Ex. 2 | Ex. 3 | Ex. 4 | Comp. Ex. 1 | Comp. Ex. 2 |
|---|---|---|---|---|---|---|
| Kneadability | | | | | | |
| Frequency of bagging occurrence | Very low | Low | Very low | Very low | Very low | High |
| Moldability | | | | | | |
| Poor flow in mold | none | none | none | none | none | found |
| Wear evaluation | | | | | | |
| Wear depth (mm) | 0.11 | 0.05 | 0.10 | 0.05 | 0.25 | — |
| Sealability | | | | | | |
| Amount of leaked oil (mg) | 15 | 8 | 12 | 10 | 140 | — |

It is apparent from the foregoing results that use of hydrogenated NBR with a low Mooney viscosity enables high density filling of carbon fibers without deterioration of kneadability and moldability, and also enables improvement of wear resistance of sealing members. Degree of improvement of wear resistance is effectively pronounced by increasing amount of carbon fibers, as shown by the results of Examples 1 and 3 using 65 parts by weight of carbon fibers and Examples 2 and 4 using 120 parts by weight of carbon fibers in contrast of Comparative Example 1 using 45 parts by weight of carbon fibers. In Comparative Example 2, 65 parts by weight of carbon fibers is used for 100 parts by weight of hydrogenated NBR with a Mooney viscosity of 85, resulting in poor flow in mold, and consequent failure of molding.

INDUSTRIAL UTILITY

High density filling of carbon fibers such as 65 to 200 parts by weight of carbon fibers on the basis of 100 parts by weight of hydrogenated nitrile rubber can be attained by using hydrogenated nitrile rubber with a Mooney viscosity of not more than 80, preferably about 50 to about 70, without deteriorating the kneadability and moldability, and such a hydrogenated nitrile rubber composition can form cross-linked sealing members having a high wear resistance suitable for sealing a fluid, for example, a liquid such as engine oil, gear oil, transmission oil, water, an aqueous liquid containing water as the main component such as a long life coolant, etc., or a gas such as a cooling medium such as flon, carbon dioxide, etc., natural gas, nitrogen, hydrogen, etc., under sever conditions of high temperatures, high pressure, high speeds, etc. and also showing such performances as not to lower mechanical and physical properties even under high temperature conditions due to heat generation by sliding, etc.

The cross-linked sealing members show good and satisfactory sealing performances as sealing members sliding on rotating shafts, etc., when used even for a long time under the afore-mentioned severe conditions.

The invention claimed is:

1. A hydrogenated nitrile rubber composition which comprises 100 parts by weight of hydrogenated nitrile rubber with a bound acrylonitrile content of at least 30 wt. %, a Mooney viscosity $ML_{1+4}$ (100° C.) of 70 to 50 (median value) and an iodine number of 28 or less (median value) and 65 to 200 parts by weight of carbon fibers.

2. A hydrogenated nitrile rubber composition according to claim 1, which further contains 100 or less parts by weight of carbon black.

3. A hydrogenated nitrile rubber composition according to claim 1, which further contains 60 or less parts by weight of graphite.

4. A hydrogenated nitrile rubber composition according to claim 1, which further contains 30 to 100 parts by weight of carbon black and 5 to 60 parts by weight of graphite.

5. A hydrogenated nitrile rubber composition according to claim 2, wherein a sum total of fillers in the composition, including carbon fibers, is 90 to 250 parts by weight.

6. A molding material for sealing members which comprises the hydrogenated nitrile rubber composition of claim 1.

7. A molding material for sealing members which comprises the hydrogenated nitrile rubber composition according of claim 4.

8. A hydrogenated nitrile rubber composition according to claim 3, wherein a sum total of fillers in the composition, including carbon fibers, is 90 to 250 parts by weight.

9. A hydrogenated nitrile rubber composition according to claim 4, wherein a sum total of fillers in the composition, including carbon fibers, is 90 to 250 parts by weight.

* * * * *